P. H. KLERSY.
SNELL FASTENER.
APPLICATION FILED MAR. 1, 1912.
1,047,654.
Patented Dec. 17, 1912.
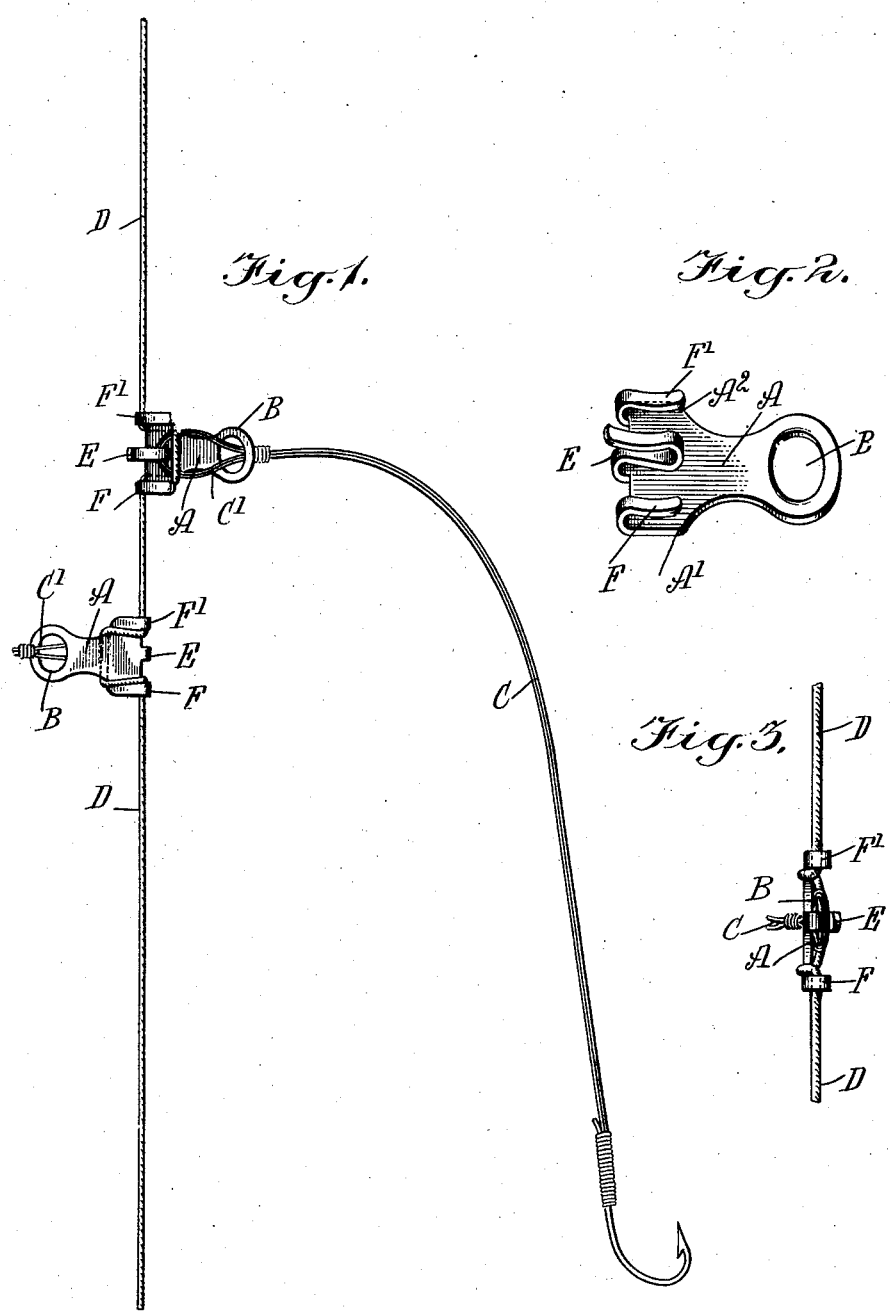

UNITED STATES PATENT OFFICE.

PETER H. KLERSY, OF NEW YORK, N. Y.

SNELL-FASTENER.

1,047,654.  Specification of Letters Patent.  Patented Dec. 17, 1912.

Application filed March 1, 1912. Serial No. 680,862.

*To all whom it may concern:*

Be it known that I, PETER H. KLERSY, a citizen of the United States, and a resident of the city of New York, borough of Brooklyn, in the county of Kings and State of New York, have invented a new and Improved Snell-Fastener, of which the following is a full, clear, and exact description.

The invention relates to fishing tackle, and its object is to provide a new and improved fastener for fastening snells and the like to the fishing line at any desired point in a very simple manner and without requiring knotting of the line, at the same time extending the snell in a practically right-angled position relative to the fishing line to prevent entangling of the snell with the line, and, in case a number of snells are used on the same line, the fasteners act as a spreader to extend the snells in different directions from the line and in a different plane to allow the use of a large number of snells, if desired, and to avoid entangling of such snells one with the other or with the fishing line.

For the purpose mentioned, the fastener is provided with spaced line retaining hooks for engagement with the line and a snell retaining hook for engagement by the loop of the snell and arranged intermediate the said line-retaining hooks and extending in a direction opposite to the one of the line-retaining hooks.

A practical embodiment of the invention is represented in the accompanying drawings forming a part of this specification, in which similar characters of reference indicate corresponding parts in all the views.

Figure 1 is a side elevation of two fasteners as applied to connect two snells to a fishing line; Fig. 2 is a perspective view of a fastener; and Fig. 3 is an enlarged edge view of the same as applied.

The fastener is preferably made from a piece of sheet metal shaped to form a flat body A, provided at one side with an eye B for the passage of the loop C' of the snell C to be supported from the fishing line D. On the body A directly to one side of the eye B is arranged a hook E opening outwardly and adapted to be engaged by the loop C' of the snell C, as plainly indicated in the drawings. Line-retaining hooks F, F' form part of the body A below and above the snell-retaining hook E for engagement with the line D, the said line-retaining hooks F and F' being open inwardly, that is, toward the eye B. The line-retaining hooks F and F' overlie the body A at the bottom and top portions A', A² of the said body A.

Now in using the fastener for fastening the snell C to the line D at any desired point in the length of the line, the operator passes the loop C' of the snell C through the eye B from the rear of the body A and then hooks the loop C' onto the snell-retaining hook E. The operator next takes the portion of the line on which the fastener is to be attached and passes the same over the loop C' of the snell C, then passes the lower portion of the line around the back of the bottom portion A' and then passes the line to the front and under the hook F in a downward direction; in a like manner the upper portion of the line is passed to the back of the top portion A², then to the front and into the hook F' in an upward direction, so that the fastener A is firmly attached to the line D and at the same time the snell C is securely fastened to the fastener A by passing through the eye B and engaging the hook E, being locked in this position by a part of the line D passing over the loop C', as plainly indicated in Fig. 1. It will be seen that by the arrangement described the line extends straight downward from the hook F and straight upward from the hook F' so that the upper and lower portions of the line are in vertical alinement with each other, and consequently the body A of the fastener extends at a right angle from the line and with it the loop end of the snell C.

In practice, the line-retaining hooks F and F' are bent inward at the middle toward the body A to leave a distance between the body and the corresponding hook somewhat less than the thickness of the fishing line D, and consequently the line when drawn into a hook F or F' is not liable to pass accidentally out of the said hook. By passing the line over the front of the loop C' and then to the back of the bottom and top portions A' and A² and finally into the line-retaining hooks F and F' the fastener is held against up or down movement of the line D.

It is understood that in making the fastener from sheet metal the hooks E, F, and F' can be readily struck up from the sheet metal, and the eye B can be readily formed by punching a hole in the sheet metal. However, the fastener may be made of wire and hence I do not limit myself to the particular construction shown and described. It will also be noted that by mounting the fastener on the fish line in the manner described the fastener cannot turn on the line and hence a number of fasteners with snells attached thereto can be placed on the line one above the other and extending in different directions, the fasteners acting as spreaders for the snells to prevent the same from becoming entangled one with the other or with the fish line.

Having thus described my invention, I claim as new and desire to secure by Letters Patent:

1. A fastener for fastening snells to fish lines made of a single piece of metal and provided with open spaced line-retaining hooks for engagement with the fish line, an eye for the passage of the loop of the snell, and an open snell-retaining hook to one side of the said eye and intermediate the said line-retaining hooks.

2. A fastener for fastening snells to fish lines, comprising a flat body of sheet metal, an eye on the said body for the passage of the snell loop, an open snell-retaining hook on the said body to one side of the said eye and adapted to be engaged by the snell loop, and open line-retaining hooks on the said body for engagement by the line.

3. A fastener for fastening snells to fish lines made of a single piece of metal provided at one side with an eye and on the other side with three hooks located one above the other and of which the middle hook is a snell-retaining hook adapted to receive the loop of the snell passed through the said eye, and the upper and lower hooks are line-retaining hooks opening inwardly for engagement by the fish line to permit of passing a portion of the fish line over the snell loop intermediate the eye and the snell-retaining hook.

4. A fastener for fastening snells to fish lines, made of a single piece of metal provided with an eye for the passage of the snell loop, a snell-retaining hook adapted to be engaged by the snell loop and arranged to one side of the said eye, and line-retaining hooks, one arranged above the said snell-retaining hook and one located below the same, the said line-retaining hooks being open inward toward the eye and the snell-retaining hook being open in an outward direction.

In testimony whereof I have signed my name to this specification in the presence of two subscribing witnesses.

PETER H. KLERSY.

Witnesses:
THEO. G. HOSTER,
PHILIP D. ROLLHAUS.